(12) United States Patent
Bal et al.

(10) Patent No.: US 8,731,214 B2
(45) Date of Patent: May 20, 2014

(54) NOISE REMOVAL SYSTEM

(75) Inventors: Ankur Bal, Noida (IN); Anupam Jain, New Delhi (IN); Rakhel Kumar Parida, Noida (IN)

(73) Assignee: STMicroelectronics International N.V., Amsterdam (NL)

( * ) Notice: Subject to any disclaimer, the term of this patent is extended or adjusted under 35 U.S.C. 154(b) by 1062 days.

(21) Appl. No.: 12/766,210

(22) Filed: Apr. 23, 2010

(65) Prior Publication Data

US 2011/0142254 A1    Jun. 16, 2011

(30) Foreign Application Priority Data

Dec. 15, 2009  (IN) .......................... 2606/DEL/2009

(51) Int. Cl.
*H04B 15/00* (2006.01)
(52) U.S. Cl.
USPC ........................................ 381/94.1; 381/94.3
(58) Field of Classification Search
USPC ........... 381/71.1–71.14, 94.1–94.9, 316–321; 700/94; 704/226–230, 233; 375/E7.208
See application file for complete search history.

(56) References Cited

U.S. PATENT DOCUMENTS

| 5,732,388 | A | * | 3/1998 | Hoege et al. ................... 704/205 |
| 5,937,377 | A | * | 8/1999 | Hardiman et al. ............ 704/225 |
| 6,173,003 | B1 | * | 1/2001 | Whikehart et al. ........... 375/130 |
| 6,356,870 | B1 | * | 3/2002 | Hui et al. ...................... 704/500 |
| 7,340,065 | B2 | | 3/2008 | Nakamura et al. |
| 7,450,725 | B2 | | 11/2008 | Vaishya |
| 7,536,018 | B2 | | 5/2009 | Onishi et al. |
| RE43,191 | E | * | 2/2012 | Arslan et al. .................. 704/226 |

OTHER PUBLICATIONS

"Active Noise Cancellation (ANC)", Texas Instruments, http://focus.ti.com/docs/solution/folders/print/364.html, pp. 1-2, on or before Nov. 12, 2009.

* cited by examiner

*Primary Examiner* — Xu Mei
(74) *Attorney, Agent, or Firm* — Hogan Lovells US LLP

(57) ABSTRACT

A system for noise removal is coupled to a signal unit that provides a digital signal. The noise removal system includes a transformation module to transform the digital signal into an f-digital signal, a threshold filter to generate a noiseless signal from the f-digital signal based on a threshold profile, and a signal synthesizer to provide a gain to the noiseless signal and to transform the noiseless signal into an output signal.

25 Claims, 11 Drawing Sheets

NOISE REMOVAL SYSTEM

RELATED APPLICATION

The present application claims priority of India patent Application No. 2606/DEL/2009 filed Dec. 15, 2009, which is incorporated herein in its entirety by this reference.

FIELD OF THE INVENTION

The present invention relates to noise removal systems and more particularly to active noise removal systems for removal of background noise which otherwise can distort signals processed and/or measured by electrical appliances.

BACKGROUND

A variety of appliances, such as mobile phones, set-top boxes, electrocardiogram (ECG) monitors, and music systems suffer from noise, due to which a useful signal gets distorted. Background or ambient noise is generally controlled using noise removal systems. Noise removal systems can include an active noise removal system, such as an active noise cancellation (ANC) system, and a passive noise removal system. While passive noise removal systems use unpowered techniques, such as insulation or sound absorbing ceiling tiles or mufflers, the active noise removal systems use powered systems for the removal of the background noise.

The active noise removal systems generally include an analog-to-digital converter (ADC) due to which quantization noise is also introduced in a digitized output signal. Quantization noise is the difference between an actual value of an analog input signal and the corresponding digitized output signal. Generally, different techniques, such as oversampling and dithering, are used to reduce the quantization noise. However, such techniques are usually inefficient and also result in a loss of signal reliability. Further, in an ANC system, generally an anti-noise signal having the same amplitude, but an opposite phase to that of the noise signal is used to cancel the noise signal. However, this leads to a loss of fidelity and overall signal energy.

SUMMARY

This summary is provided to introduce concepts related to a noise removal system, which are further described below in the detailed description. This summary is not intended to identify essential features of the claimed subject matter, nor is it intended for use in determining the scope of the claimed subject matter.

In an embodiment, the system includes a signal unit for providing a digital signal and a noise removal system coupled to the signal unit. The noise removal system includes a transformation module configured to transform the digital signal into an f-digital signal, a threshold filter configured to generate a noiseless signal from the f-digital signal based on a threshold profile, and a signal synthesizer configured to provide a gain to the noiseless signal and to transform the noiseless signal into an output signal.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION OF PREFERRED EMBODIMENTS

Systems and methods for noise removal are described herein. In particular, the systems and methods remove noise from a signal and process the signal to improve dynamic headroom. These systems and methods can be implemented in a variety of electronic and communication devices, such as set-top boxes, mobile phones, monitors, music systems, and automobiles.

In one implementation, a digital signal suffering from background noise and quantization noise is transformed into a frequency-domain digital signal. The frequency-domain digital signal includes bins corresponding to both the useful signal and the noise signal. To remove noise, the bins corresponding to the noise signal (also known as noise bins) are removed from the frequency-domain digital signal, based on an amplitude threshold value. The amplitude threshold value can be either dynamic or static. The remaining bins, i.e., the bins corresponding to the useful signal (also referred to as useful bins), are processed to occupy a dynamic headroom created due to the noise removal. Such processing helps in improving fidelity of the digital signal. Further, the system may be configured to create an output signal with greater dynamic range and precision than an analog input signal while removing both background and quantization noise.

Figure 1:
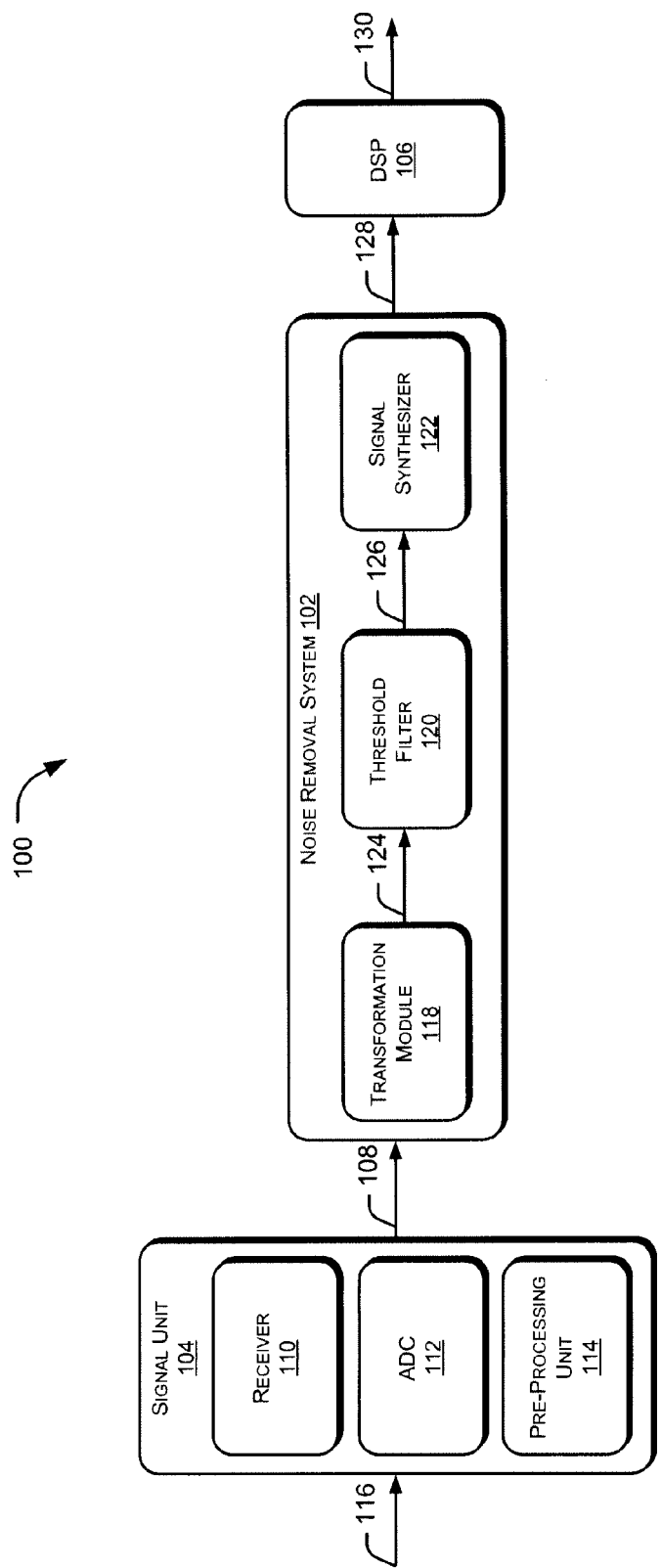
FIG. 1 illustrates an electronic system implementing an exemplary noise removal system, according to an embodiment of the present subject matter.

FIG. 1 illustrates a system 100 implementing an exemplary noise removal system 102, according to an embodiment of the present subject matter. It will be understood that any number of the described system blocks can be combined in any order to implement the system 100, or an alternate system. Additionally, individual blocks may be deleted from the system 100 without departing from the scope of the present subject matter. The system 100 can be implemented in any suitable hardware, software, firmware, or a combination thereof.

The system 100 includes a noise removal system 102, a signal unit 104, and a digital signal processor (DSP) 106. In an embodiment, the signal unit 104 includes a receiver 110, an analog-to-digital converter (ADC) 112, and a pre-processing unit 114. The receiver 110 receives an analog input signal 116 from an external source such as a microphone (not shown in this figure). The analog input signal 116 may be an audio signal, a video signal, or a data signal, which may suffer from background noise. Background noise is any unwanted signal associated with the useful signal.

The receiver 110 transfers the analog input signal 116 to the ADC 112. The ADC 112 samples the received analog input signal 116 and assigns a discrete value or bit to each sample of the analog input signal 116 to provide a digital signal. The digital signal thus generated is usually noisy and is a combination of useful bits and noise bits. Some of the noise bits in the noisy digital signal correspond to the background noise in the analog input signal 116. Additional noise bits may get introduced in the noisy digital signal due to quantization noise induced during analog-to-digital conversion. Quantization noise is the difference between an actual analog input value corresponding to voltage or current of an input signal and a quantized digital value. The quantized digital value in turn is the digital equivalent of the analog input value and is provided by an ADC, such as the ADC 112.

The noisy digital signal thus generated can be of N-bits where the value of N depends on the configuration of the ADC 112, as will be understood by a person skilled in the art. For example, a 16-bit ADC can generate a 16-bit digital signal. Examples of the ADC 112 include, but are not limited to, a sigma-delta ADC, a successive approximation ADC, a flash ADC, etc.

In one embodiment, the signal unit 104 may be configured to directly provide the noisy digital signal to the noise removal system 102 without any pre-processing. In another embodiment, the digital signal 108 can be provided to the noise removal system 102 after pre-processing of the noisy digital signal for preliminary noise removal.

For the purpose of preliminary noise removal, the noisy digital signal may be fed to a pre-processing unit 114. The pre-processing unit 114 may include adders or subtractors as illustrated in the subsequent figures. In one implementation, the pre-processing unit 114 cancels background noise by subtracting an equivalent noise from the noisy digital signal to yield a digital signal 108. Further, the digital signal 108 is fed to the noise removal system 102. In another implementation, in order to reduce quantization noise, the pre-processing unit 114 adds a dither signal to the noisy digital signal to yield the digital signal 108. The digital signal 108 is then fed to the noise removal system 102.

In an embodiment, the noise removal system 102 includes a transformation module 118, a threshold filter 120, and a signal synthesizer 122. The transformation module 118 receives the digital signal 108 and transforms it from time domain to frequency domain. The transformed signal in frequency domain is hereinafter referred to as f-digital signal 124.

In order to generate the f-digital signal 124, the transformation module 118 determines the number of frequency coefficients associated with the digital signal 108. The frequency coefficients represent amplitudes of a pre-defined number of frequency samples or frequency points. In one implementation, the number of frequency coefficients can be determined based on techniques used for the transformation and on the intended application of the f-digital signal 124. Examples of such techniques include, but are not limited to, Fast Fourier Transform (FFT), Discrete Cosine Transform (DCT), and Discrete Wavelet Transform (DWT).

Typically, two frequency samples are chosen to represent a frequency range that contains energy in the form of a voltage. The frequency range is hereinafter referred to in terms of a frequency bar or frequency bin. A number of such frequency bins represent a frequency spectrum of the digital signal in the form of the f-digital signal 124.

As mentioned before, the digital signal 108 is a combination of useful bits and noise bits. Similarly, the f-digital signal 124, which is a frequency domain transformation of digital signal 108, also includes a combination of useful bins and noise bins. The noise bins, like the noise bits, correspond to the background and quantization noise. The total energy in the frequency spectrum of a particular f-digital signal 124 is thus distributed over the useful bins and the noise bins. Such an f-digital signal is fed to the threshold filter 120. Alternatively, the f-digital signal 124 may be first optimized using a signal optimizer (not shown in the figure), which removes background noise based on a known noise profile of the background noise. The optimized f-digital signal may then be provided to the threshold filter 120.

The threshold filter 120 refines the f-digital signal 124 by removing the noise bins based on a threshold profile. In an implementation, the threshold profile can be an amplitude threshold value for the f-digital signal 124. The amplitude threshold value can either be pre-set in the threshold filter 120 or can be calculated dynamically by the threshold filter 120. In an implementation, the threshold filter 120 can remove or purge the bins having amplitude values below the amplitude threshold value and select the bins having amplitude values above the amplitude threshold value to get rid of the noise bins. The removal of the noise bins refines the f-digital signal 124 to generate a noiseless signal 126. Additionally, removal of the noise bins also leaves a dynamic headroom in the noiseless signal 126, which is then fed to the signal synthesizer 122.

The signal synthesizer 122 increases a gain of the received noiseless signal 126 so that the dynamic headroom in the noiseless signal 126 gets occupied. For example, in case an FFT is used to transform the digital signal 108 to the f-digital signal 124, the gain of the noiseless signal 126 can be increased by increasing the number of FFT frequency samples or, simply, FFT points. In another implementation, the dynamic headroom can be occupied by providing the gain to the noiseless signal 126 such that the gain is proportional to the total energy lost in the removed bins.

Thus, the signal synthesizer 122 provides an increased gain noiseless signal, hereinafter referred to as f-recovered signal. The signal synthesizer 122 can also be configured to reconstruct the f-recovered signal in time domain to yield an output signal 128. The output signal 128 in time domain can be obtained using a variety of techniques, such as inverse FFT, inverse DCT, and inverse DWT, as known in the art.

The output signal 128 is generated such that it can accommodate the extra bits generated due to the gain or amplification by the signal synthesizer 122. For example, an f-recovered signal can be boosted to provide a 20-bit output signal 128 when the ADC 112 was originally configured to generate an 18-bit output signal 128. Examples of the signal synthesizer 122 include, but are not limited to, a phase locked loop (PLL) frequency synthesizer, a direct digital synthesizer, a digiphase synthesizer, a sine generator, a cosine generator, etc.

The output signal 128 can be sent to a digital signal processor (DSP) 106 to further process the output signal 128 by using a variety of techniques known in the art, such as filtration, amplification, and modulation, to provide a processed signal 130. The processed signal is substantially free from the background noise and the quantization noise, and can be used for a variety of applications. In an implementation, the processed signal 130 can be applied to an amplifier to drive a speaker (not shown in this figure) to receive a reliable voice output. The noise removal system 102 has been shown as a component separate from the DSP 106. However, it will be understood that the noise removal system 102 can be included in the DSP 106 in a different embodiment.

Figure 2:
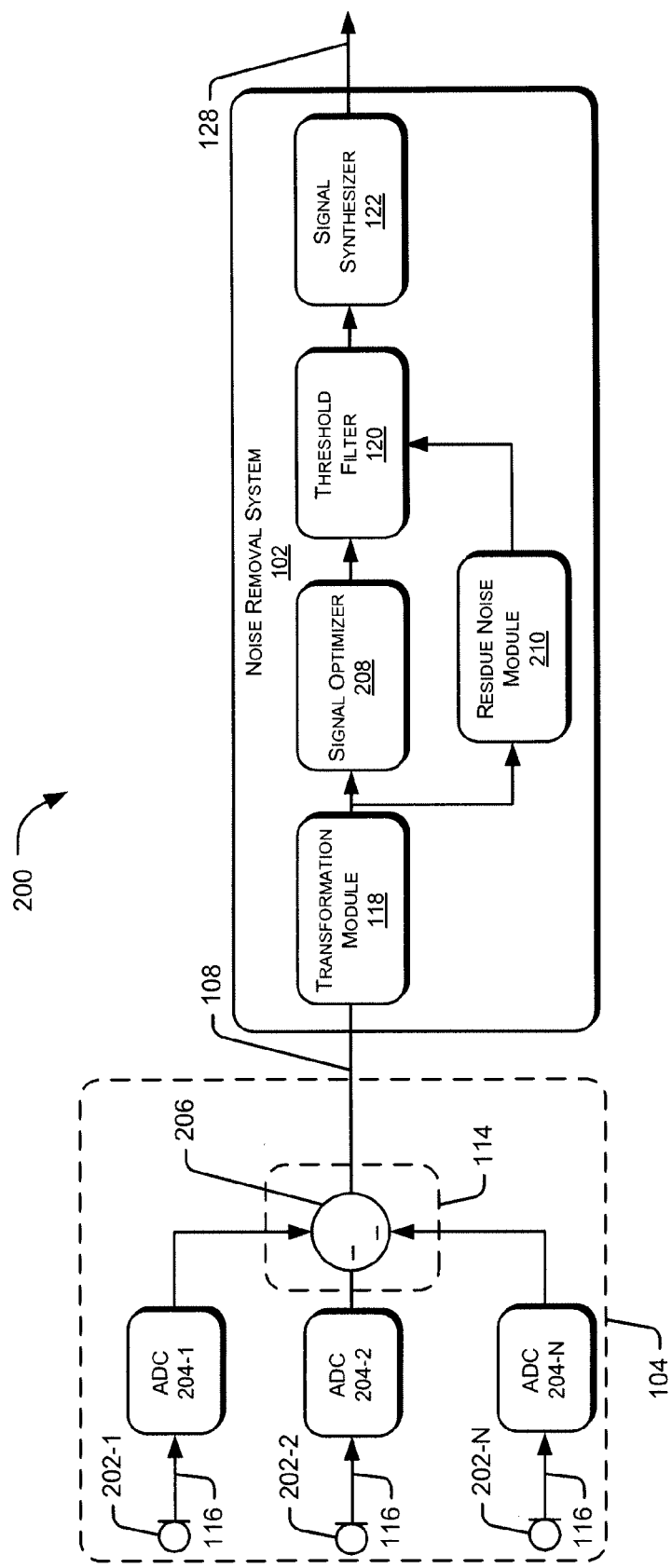
FIG. 2 illustrates the exemplary noise removal system, according to another embodiment of the present subject matter.

FIG. 2 illustrates the exemplary noise removal system 102, according to another embodiment of the present subject matter. By way of an example, the noise removal system, such as the noise removal system 102, has been explained hereinafter as part of an audio processing system 200, such as one used in mobile phones. However, it will be understood that the noise removal system 102 can be implemented in a variety of systems used for different applications.

The audio processing system 200 includes multiple microphones 202-1, 202-2, . . . , 202-N, hereinafter referred to as microphones 202, to provide analog input signals 116. The analog input signals 116 may suffer from background noise generated by a noise source. For the purpose of illustration, the noise source is assumed to be a distant source relative to the external sources of the analog input signals 116. As a result, the background noise appears as a common mode signal to the microphones 202. On the other hand, the analog input signals 116 from the desired source appears as a differential signal to the microphones 202.

The microphones 202 provide the analog input signals 116 to respective analog-to-digital converters (ADC) 204-1, 204-2, . . . , 204-N, hereinafter referred to as ADCs 204. In an embodiment, the microphones 202 can be connected in a phase offset geometry to the ADCs 204 with equal group delays. Based on their types, for example, 8-bit or 16-bit, the ADCs 204 process the received analog input signals 116 to provide corresponding noisy digital signals. Further, the noisy digital signals from the ADCs 204 may be combined to provide one noisy digital signal In one embodiment, the noisy digital signal can be pre-processed for reducing the noise using a system of subtractors and adders, for example subtractor 206, and provide a digital signal 108. The digital signal 108 may still have background noise. Therefore, the digital signal 108 is further processed by the noise removal system 102.

In an embodiment, the noise removal system 102 includes the transformation module 118, a signal optimizer 208, the threshold filter 120, the signal synthesizer 122, and a residue noise module 210. The transformation module 118 receives the digital signal 108 in time domain and transforms it into the frequency domain to generate the f-digital signal 124 in a manner similar to that discussed above.

As discussed earlier, the total energy of the frequency spectrum is distributed over the useful bins and the noise bins present in the f-digital signal 124. The noise bins occupy a chunk of the total dynamic headroom of the f-digital signal 124 and thus, limit signal reliability. Therefore, the noise bins are discarded to concentrate the spectrum energy on the useful bins such that a reliable signal with high signal peaks can be realized.

The f-digital signal 124 from the transformation module 118 can be fed to the signal optimizer 208 and to the residue noise module 210. The signal optimizer 208 performs a pre-defined phase correction to the f-digital signal 124 and acts as a preliminary noise remover. Based on a known profile of the noise signals, the signal optimizer 208 performs noise removal using signals that correspond to the noise signals, but are phase inverted with respect to the noise signals. The signal optimizer 208 then purges noise bins based on the known profile of noise signals and as a result a dynamic headroom is created in the f-digital signal 124. As a result, an optimized signal with reduced background noise is obtained. The signal optimizer 208 can be implemented using a variety of adaptive filters known in the art. Further, the optimized from the signal optimizer 208 is fed to the threshold filter 112.

In an implementation, the residue noise module 210 dynamically determines the threshold profile based on the bins of the f-digital signal 124. The threshold profile can correspond to a low level hiss or hum in the f-digital signal 124. In an implementation, the threshold profile can be a dynamically calculated amplitude threshold value based on the bins of the f-digital signal 124. The residue noise module 210 provides the determined amplitude threshold value for the f-digital signal 124 to the threshold filter 120. The amplitude threshold value can be determined by various techniques known in the art.

The parameters used to calculate the amplitude threshold value can be selected based on the level of background noise detected from the microphones 202. For example, in voice applications where the maximum number of useful bins is predictable, the residual noise module 210 can generate the amplitude threshold value such that, upon processing, only the useful bins are selected by the threshold filter 120 and the other bins, including the noise bins, are rejected. In another example, for a sensor application, the first N bins with maximum amplitude are selected and rest of the bins are purged. For an ADC precession increment application, the threshold profile is decided by the precession of the ADC and the noise bed of the ADC in the pass band. Therefore, in one implementation, to increase the precession of an 18-bit ADC to a 20-bit ADC, the threshold profile is around 130 db.

In said implementation, the threshold filter 120 receives the optimized signal from the signal optimizer 208 and the amplitude threshold value determined by the residue noise module 210. The threshold filter 120 further removes noise from the optimized signal, by rejecting those noise bins in the f-digital signal 124 that have an amplitude value below the amplitude threshold value, to generate a noiseless signal 126. In effect, high energy signal components are retained and low energy noise portions are discarded from the frequency spectrum of the f-digital signal 124 to provide the noiseless signal 126. The threshold filter 120 sends the noiseless signal 126 to the signal synthesizer 122.

The signal synthesizer 122 receives the noiseless signal 126 and facilitates regeneration of dynamically corrected signal to populate the dynamic headroom created in the signal spectrum. For populating the dynamic headroom, the signal synthesizer 122 provides a gain to the noiseless signal 126. In one example, the gain is proportional to the energy in the noise bins that were removed by the threshold filter 120. The signal synthesizer 122 can also increase signal precision or the number of bits in the noiseless signal 126.

In an implementation, the signal precision is increased by first boosting the noiseless signal 126 to recover the dynamic headroom. In one example, the boost or gain is in proportion to the total energy lost in the bins purged or removed and then based on the desired signal precision, a few least significant bits are removed to obtain the output signal 128 having desired precision. The noiseless signal 126 can be represented in time domain by using a variety of techniques, such as inverse FFT, inverse DCT, and inverse DWT. The signal synthesizer 122 may use substantially high precision twiddle factors in these techniques for further increasing the signal precision of the noiseless signal. For example, to increase the precision of an ADC from 18 to 20 bits, twiddle factors corresponding to 24 bits are used.

On account of boosting and conversion of the noiseless signal in the time domain, i.e., the output signal 128, a minimal noise signal may remain. However, such a noise signal is insignificant in comparison to the noise embedded in the received analog input signal 116. In this way, the noise removal system 102 efficiently provides the output signal 128, which is substantially free from the background noise and has a high signal-to-noise ratio (SNR).

Figure 3A:
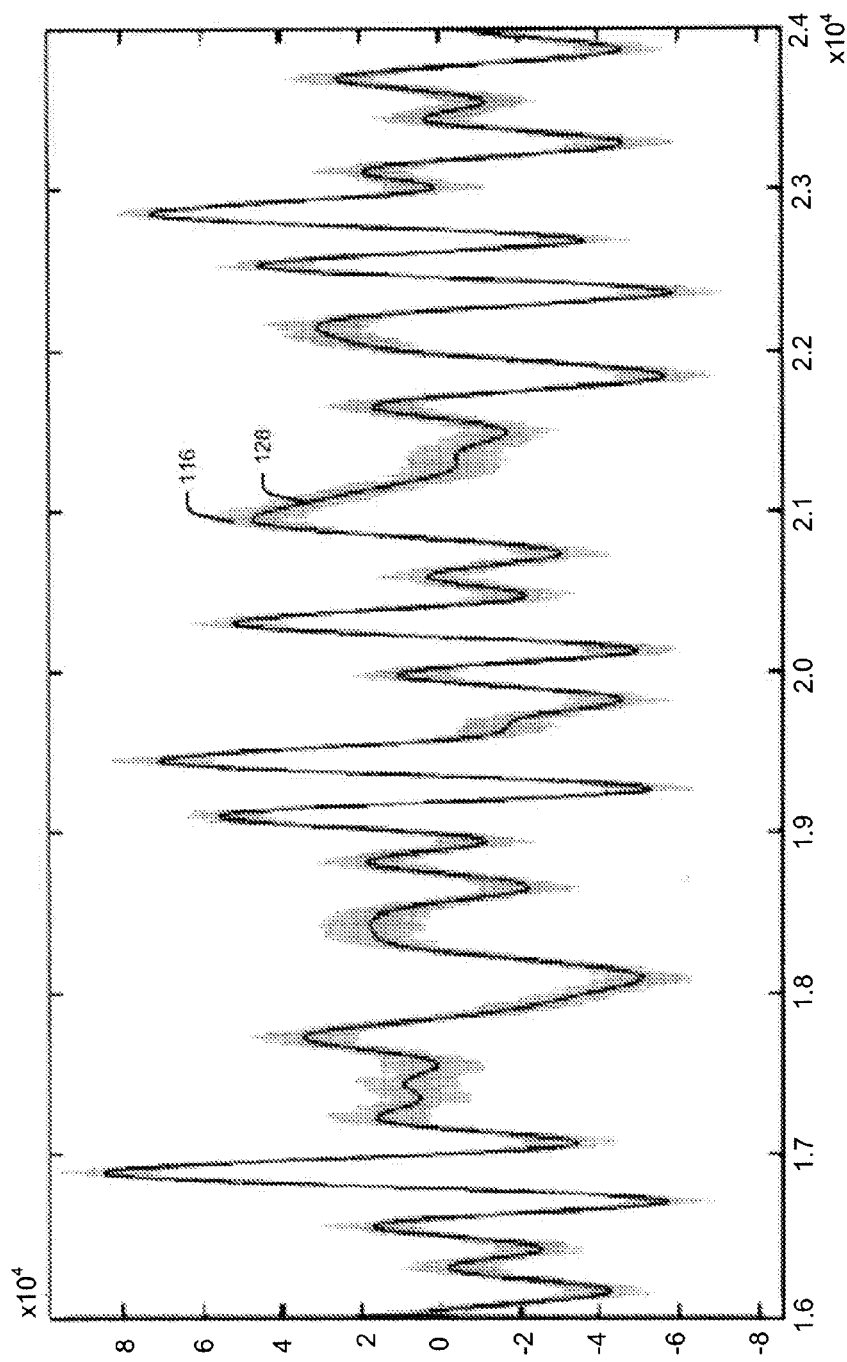
FIG. 3A shows a snapshot of a noisy multi-tone signal in time domain.
Figure 3B:
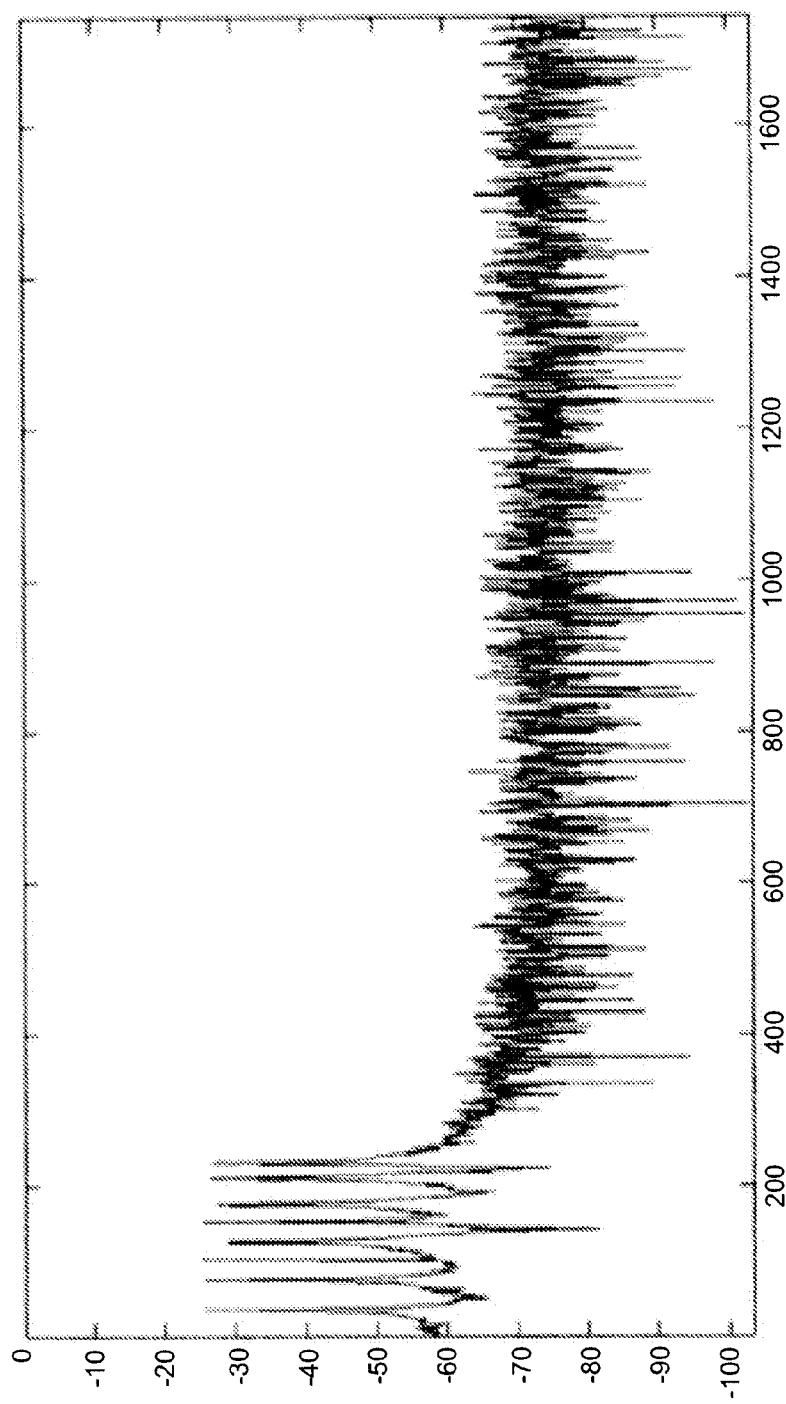
FIG. 3B represents a frequency spectrum of the noisy multi-tone signal.
Figure 3C:
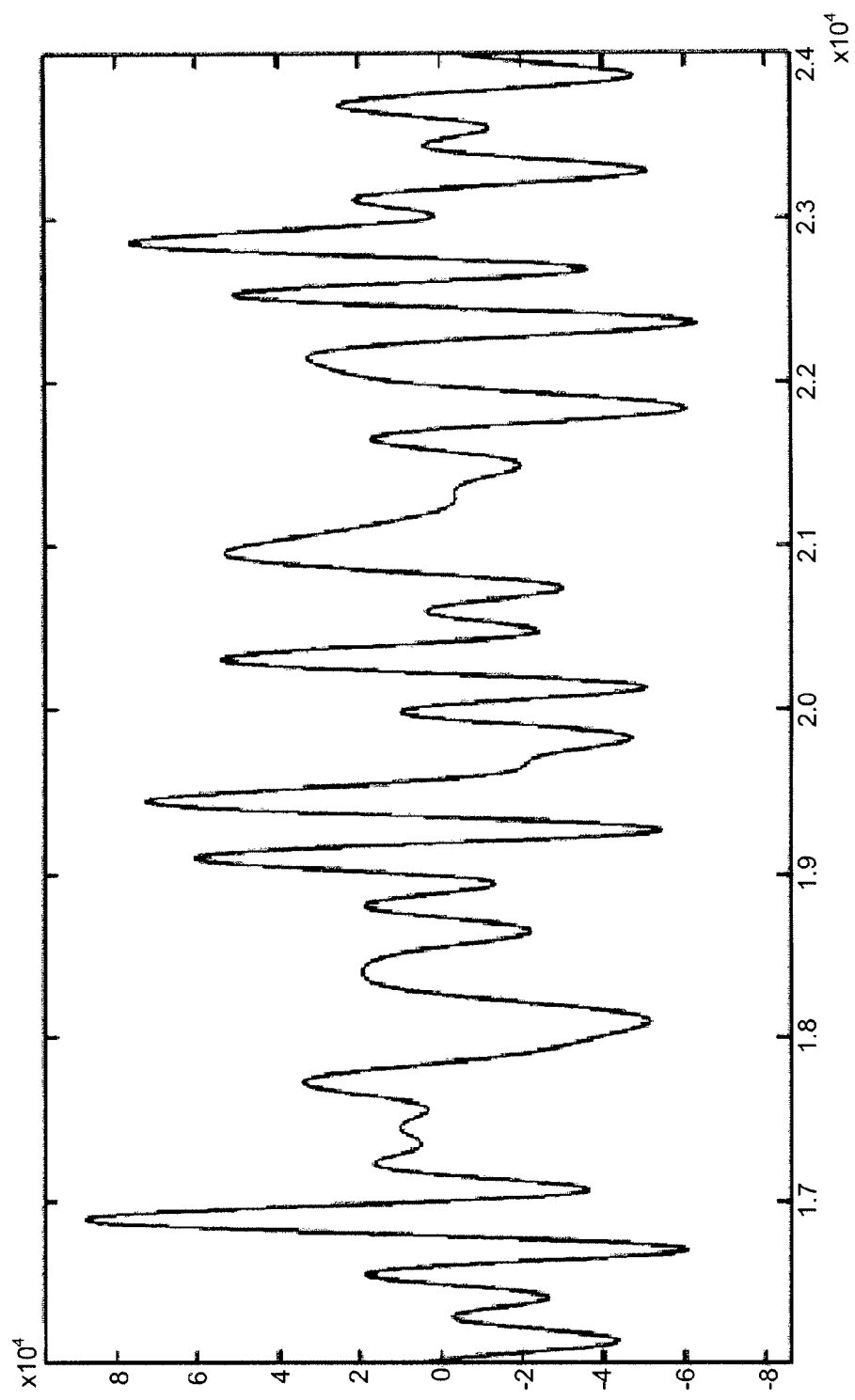
FIG. 3C represents a snapshot of the noisy multi-tone signal in time domain after it is processed by the exemplary noise removal system of FIG. 2.
Figure 3D:
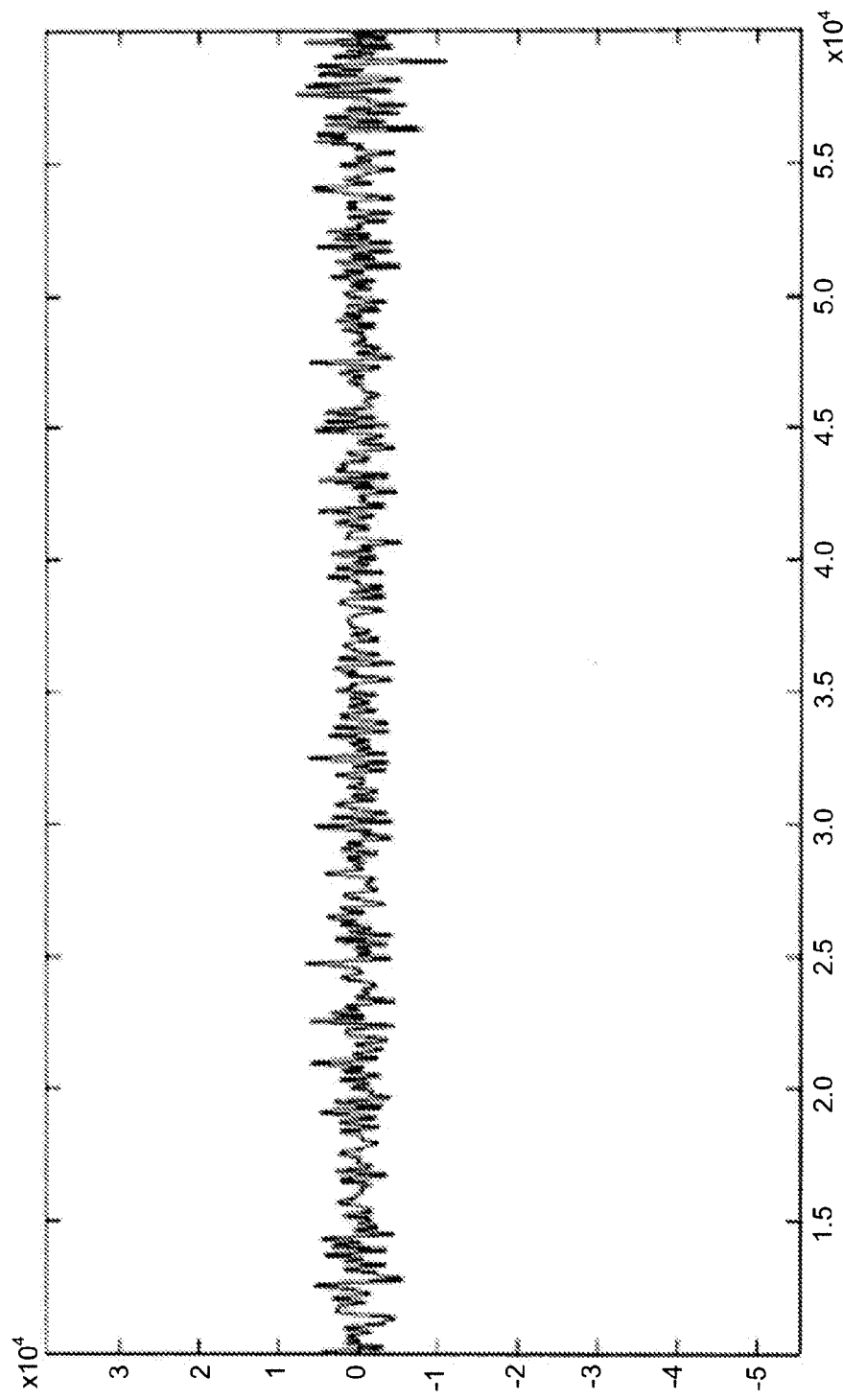
FIG. 3D illustrates an error between a noisy multi-tone signal of FIG. 3A and the output signal represented in FIG. 3C.

FIGS. 3A, 3B and 3C illustrate frequency spectrums of an analog input signal 116 and corresponding frequency spectrums of the output signal obtained after processing by the noise removal system 102 of FIG. 2. In one example, the analog input signal, such as the analog input signal 116, may be a noisy multi-tone signal. FIG. 3A shows a snapshot of the noisy multi-tone signal in time domain. FIG. 3B represents the frequency spectrum of the noisy multi-tone signal. The frequency spectrum has peaks in a few bins corresponding to the multiple tones in the multi-tone signal and low value in several bins corresponding to the noise signals. FIG. 3C represents a snapshot of the noisy multi-tone signal in time domain after it is processed by the noise removal system 102. As evident from the figure, the background noise in the noisy multi-tone signal has been considerably reduced. Also, the signal energy is improved such that a useful signal occupies the complete dynamic range. FIG. 3D illustrates an error between a noisy multi-tone signal of FIG. 3A and the output signal 128 represented in FIG. 3C.

Figure 4:
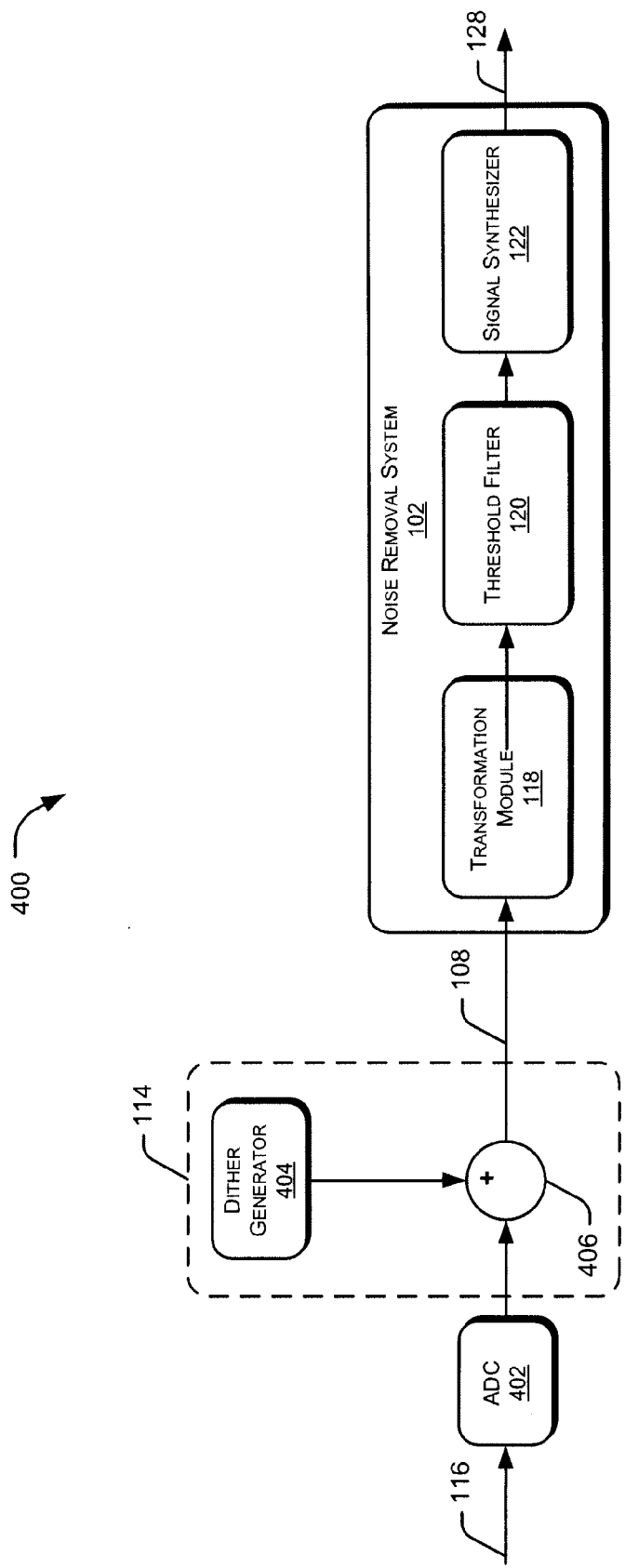
FIG. 4 illustrates an exemplary noise removal system, according to yet another embodiment of the present subject matter.

FIG. 4 illustrates the exemplary noise removal system 102 according to yet another embodiment of the subject matter. In one example, the noise removal system 102 is a part of an audio processing system 400, such as one used in mobile phones. However, it will be understood that the noise removal system 102 can be implemented in a variety of systems used for a diversity of applications. In an implementation, the audio processing system 400 includes an analog-to-digital converter (ADC) 402, a dither generator 404, an adder 406, and the noise removal system 102.

The ADC 402 samples an analog input signal 116 and, based on the configuration of the ADC 402, converts the analog input signal 116 into a noisy digital signal having a particular number of bits. The noisy digital signal may suffer from quantization noise due to rounding off and truncation of the analog input signal 116 to discrete values during quantization of the analog input signal 116. In said implementation, a dither signal generated by the dither generator 404 can be added to the noisy digital signal through the adder 406. The dither signal is a noise signal, for example, a uniformly distributed noise signal, added to the noisy digital signal in a controlled manner to attenuate leaky spurs to a certain extent. Further, the digital signal 108 is fed to the noise removal system 102.

In an embodiment, the noise removal system 102 includes the transformation module 118, the threshold filter 120, and the signal synthesizer 122. The transformation module 118 receives the digital signal 108 with reduced quantization noise or spurs. The transformation module 118 transforms the received digital signal 108 from time domain to frequency domain to determine a frequency spectrum associated with the digital signal 108 in a manner as explained in the description of FIGS. 1 and 2. The digital signal 108 represented in the frequency domain is also referred to as the f-digital signal 124. The f-digital signal 124 is fed to the threshold filter 120.

In an implementation, the threshold filter 120 receives the f-digital signal 124 and removes the quantization noise from the f-digital signal 124 based on a predefined or static threshold profile. A threshold value in the threshold profile is set depending on the desired output precision of the f-digital signal 124, which corresponds to the number of bits desired in the output signal 128. Higher number of bits may be desired by an application to increase signal reliability. For example, to achieve a 20-bit desired output signal 128, the noise should be below −130 dB.

The parameters used to calculate the threshold value are selected based on the intended application and will be well understood by a person skilled in the art. The threshold filter 120 removes the noise bins having an amplitude below the threshold value in the threshold profile to generate a noiseless signal 126. Therefore, a dynamic headroom is created in the signal spectrum of the noiseless signal 126 by removing the noise bins in the f-digital signal 124. The noiseless signal 126 is sent to the signal synthesizer 122.

The signal synthesizer 122 is configured to provide the gain to the noiseless signal for utilizing the created dynamic headroom. The signal synthesizer 122 thus generates the noiseless signal 126 in frequency domain having an increased dynamic range. It is to be noted that the signal optimizer 208 and the residue noise module 210 are not included in the present embodiment as the threshold value in the threshold profile is fixed and closely linked with the desired precision of the output signal 128.

The signal synthesizer 122 transforms the noiseless signal 126 from frequency domain to the output signal 128 in time domain as explained in the description of FIG. 2. Therefore, the noise removal system 102 provides the output signal 128 substantially free from the quantization noise having a high SNR.

Figure 5A:
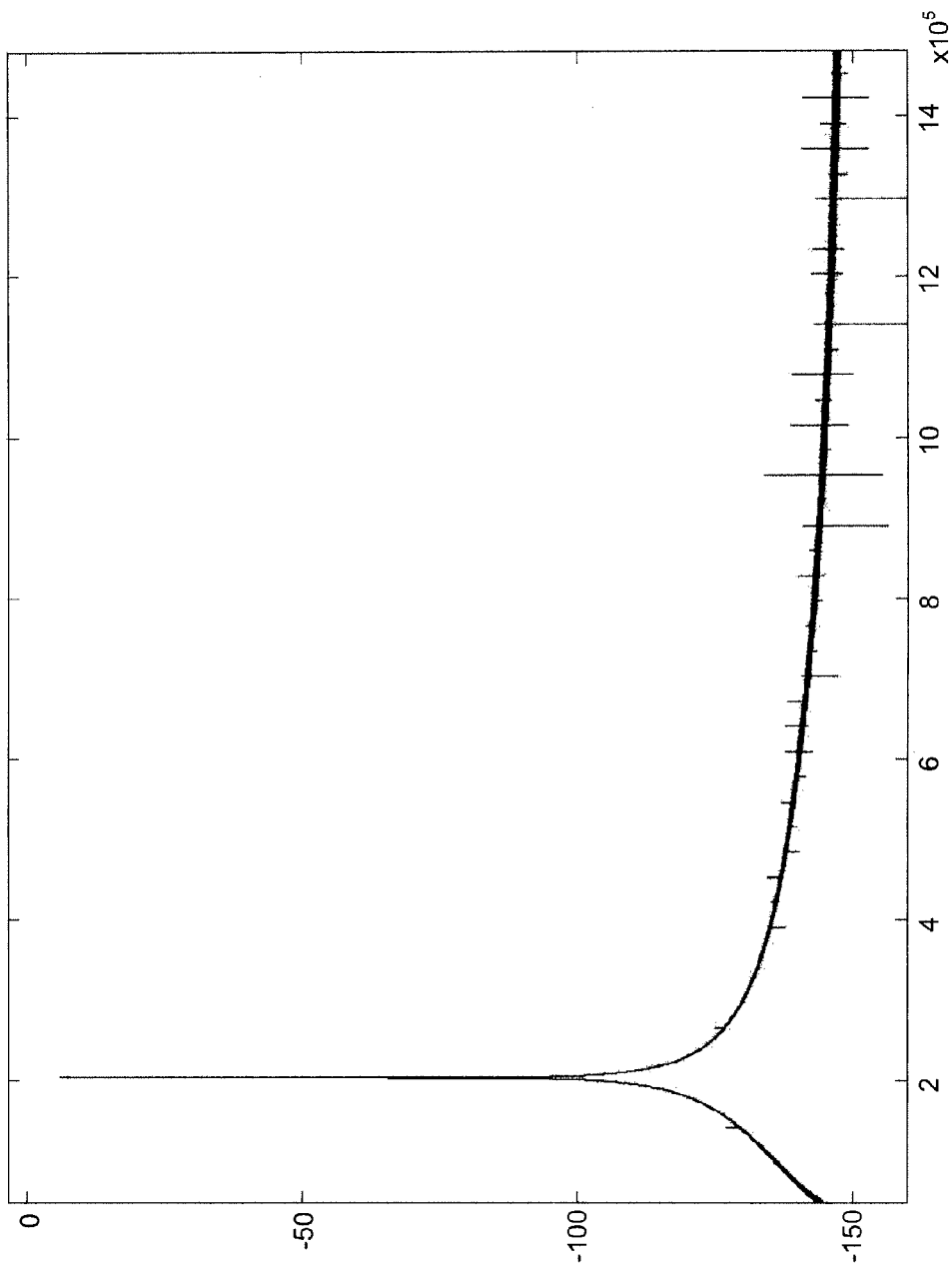
FIG. 5A illustrates an 18-bit leaky tone signal in the frequency domain.
Figure 5B:
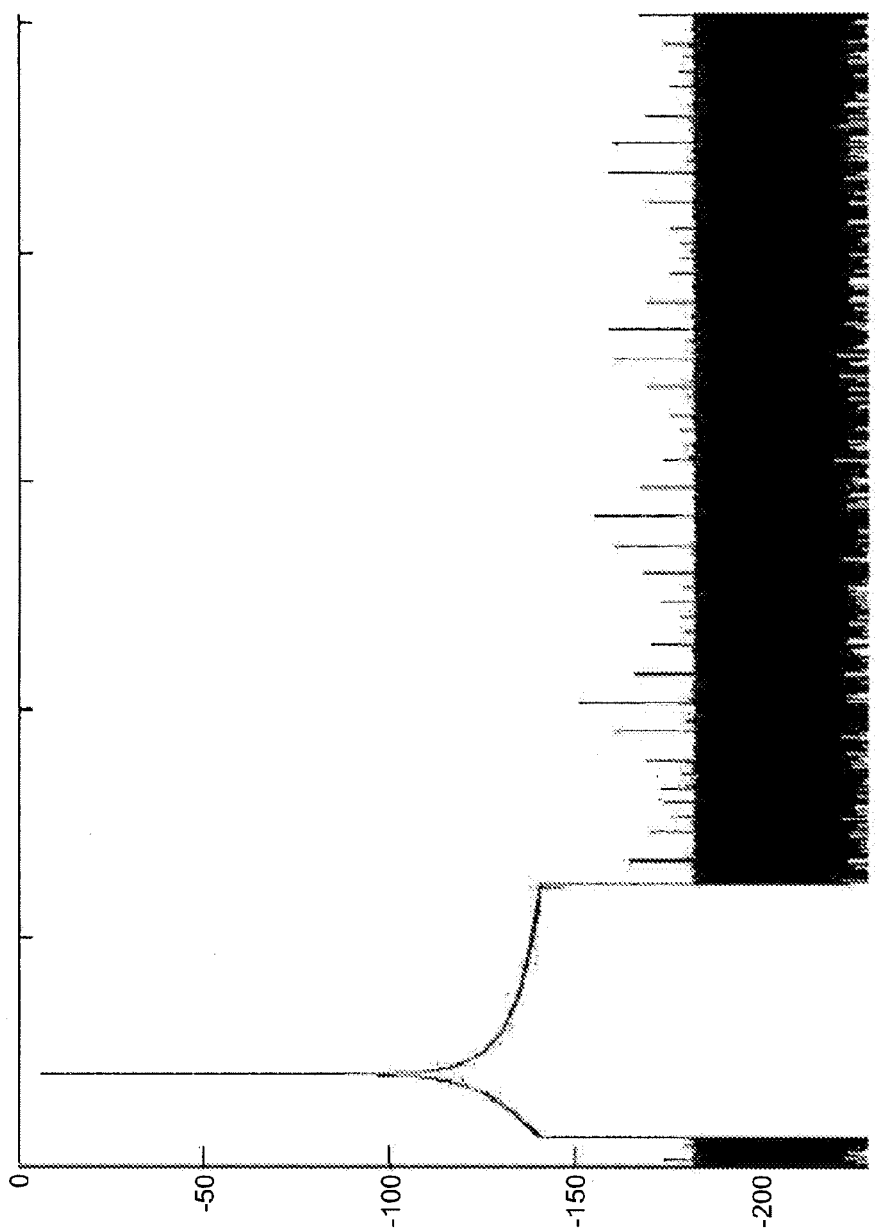
FIG. 5B illustrates the frequency domain plot of a noiseless signal generated by the noise removal system of FIG. 4.
Figure 5C:
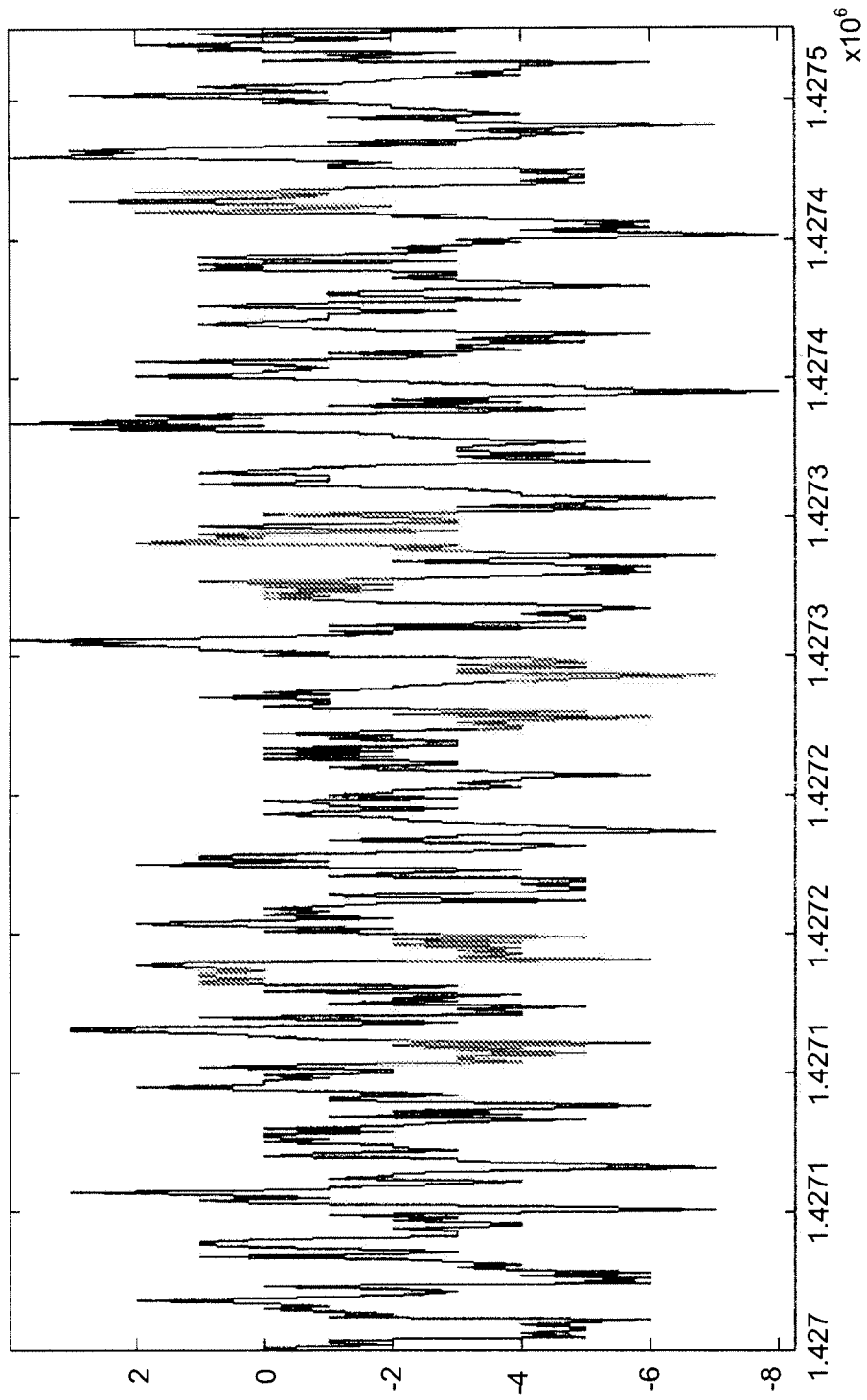
FIG. 5C represents an error plot of an output signal with respect to an ideal 20-bit time domain signal.

FIGS. 5A, 5B, and 5C illustrate frequency spectrums of the analog input signal 116 and the output signal 128 obtained after processing by the noise removal system 102 of FIG. 4. In one example, the analog input signal 116 is an 18-bit leaky tone signal. The frequency spectrums illustrate conversion of the 18-bit analog input signal 116 into a 20-bit output signal 128.

FIG. 5A illustrates the 18-bit leaky tone signal in the frequency domain. The x-axis represents frequencies of the leaky tone signal, while the y-axis represents amplitude of the leaky tone signal in decibels (dBs). FIG. 5B illustrates a frequency domain plot of the noiseless signal 126 generated using the noise removal system 102. The x-axis represents frequencies of the noiseless signal 126, while the y-axis represents amplitudes of the noiseless signal 126 in dBs. FIG. 5C represents an error plot of the output signal 128 with respect to an ideal 20-bit time domain signal.

Figure 6:
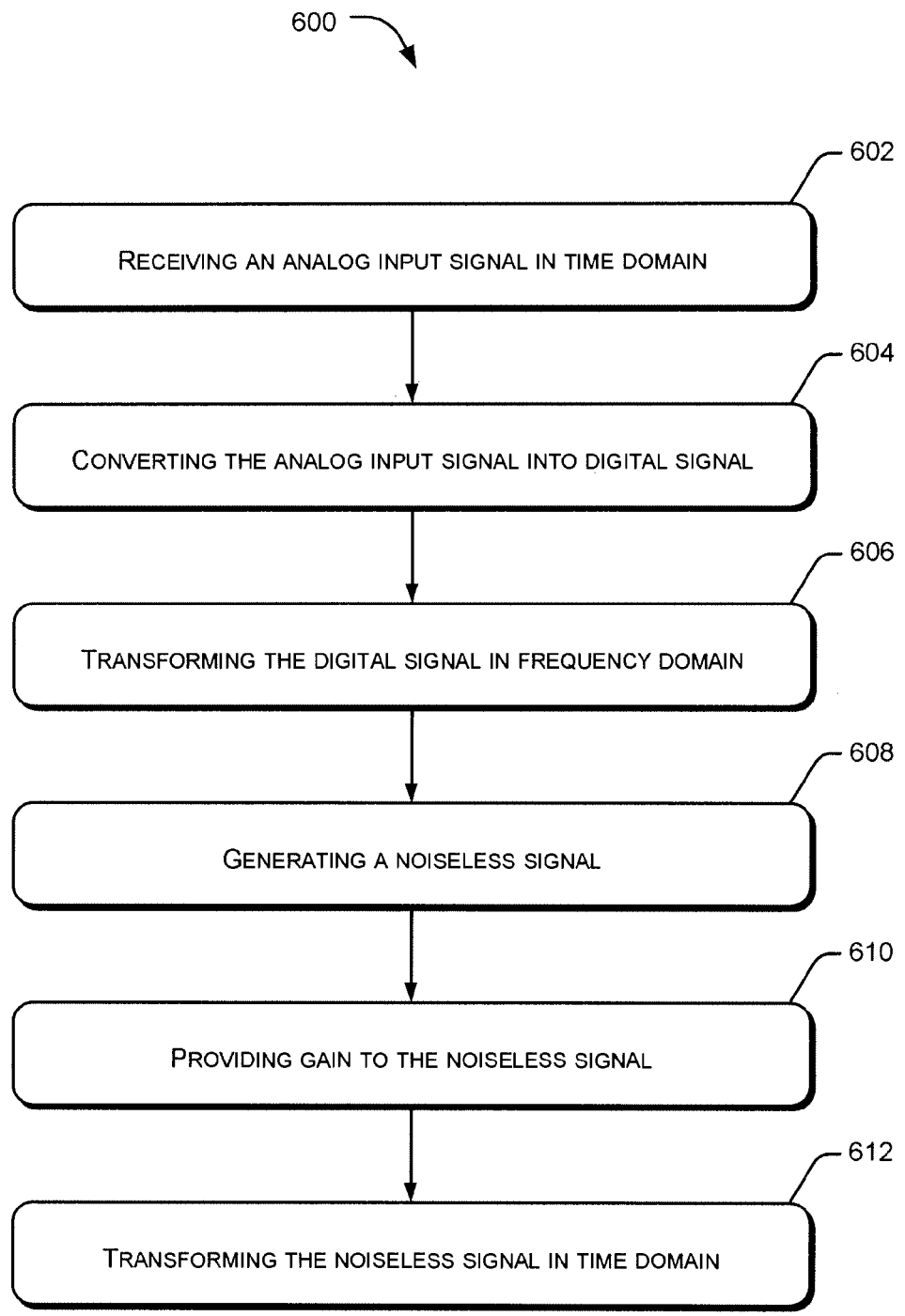
FIG. 6 illustrates an exemplary method for implementing a noise removal, in accordance with an embodiment of the present subject matter.

FIG. 6 illustrates an exemplary method 600 for implementing an exemplary noise removal system. The exemplary method may be described in the general context of analog and digital circuit elements. However, it will be noted that the method is also implementable through computer executable instructions.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein.

At block 602, an analog input signal is received. For example, the noise removal system 102 receives the analog input signals, as described in FIG. 2 and FIG. 4. The analog input signal may suffer from background noise or quantization noise or both. The analog input signal is typically represented in time domain.

At block 604, the analog input signal is converted into a digital signal. For example, the analog input signal 116 is converted into a noisy digital signal by the analog-to-digital converter 112. Further, the noisy digital signal may be pre-processed to remove quantization noise by using dither generators and adders. Similarly, the background noise can be removed by using error microphones and subtractors. The pre-processed noisy digital signal is referred to as digital signal 108.

At block 606, the digital signal is transformed into frequency domain. For example, the digital signal 108 suffering from noise is fed to the transformation module 116, which transforms the digital signal 108 from time domain to frequency domain. A range of frequency coefficients associated with the digital signal 108 are determined. The frequency spectrum of the transformed digital signal 108 or the f-digital signal 124, includes useful bins and noise bins corresponding to the background noise or the quantization noise or both.

At block 608, a noiseless signal is generated. For example, the noise bins from the f-digital signal 124 are removed based on a threshold value in a threshold profile to generate a noiseless signal. In an implementation, the f-digital signal 124 subsuming the useful bins and the noise bins can be received by the threshold filter 120. The threshold filter 120 attenuates the noise bins in the f-digital signal 124 having an amplitude below the threshold value in the threshold profile. The threshold profile can be a predefined value or a dynamically calculated value. The parameters used to calculate the threshold value are based on the intended application of the output signal 128. The removal of the noise bins from the f-digital signal 124 provides the noiseless signal 126. The noiseless signal 126 is generated with a dynamic headroom created on account of removal of the noise bins.

At block 610, a gain is provided to the noiseless signal. The noiseless signal 126 is received by the signal synthesizer 122, which amplifies the noiseless signal 126 to effectively populate the created dynamic headroom. For the purpose, the gain is provided to the signal bins in the noiseless signal to increase their amplitude. In one example, the gain is in proportion to the total energy lost in purging or removing the noise bins. As a result, the dynamic range of the noiseless signal 126 is improved.

At block 612, the noiseless signal is transformed into time domain. The signal synthesizer 122 is configured to transform the noiseless signal from frequency domain to time domain. In one implementation, the signal synthesizer uses substantially high precision twiddle factors to perform the transformation.

Although the exemplary method 600 has been explained with respect to the noise removal system 102, the disclosed method can be applied on any similar noise cancellation systems.

Although embodiments for a system for noise removal have been described in language specific to structural features and/or methods, it is to be understood that the appended claims are not necessarily limited to the specific features or methods described. Rather, the specific features and methods are disclosed as exemplary implementations for the noise removal system.

We claim:
1. A system comprising:
    a signal unit for providing a digital signal;
    a noise removal system coupled to the signal unit, the noise removal system comprising,
        a transformation module configured to transform the digital signal into an f-digital signal;
        a threshold filter configured to generate a noiseless signal from the f-digital signal based on a threshold profile;
        a signal synthesizer configured to provide a gain to the noiseless signal and to transform the noiseless signal into an output signal; and
        a residue noise module having an input coupled to the transformation module and an output coupled to the threshold filter to dynamically determine the threshold profile.

2. The system as claimed in claim 1, wherein the signal unit comprises,
    a receiver to receive an analog input signal;
    an analog-to-digital converter configured to generate a noisy digital signal from the analog input signal; and
    a pre-processing unit configured to process the noisy digital signal.

3. The system as claimed in claim 2, wherein the pre-processing unit comprises a dither generator configured to add a dither signal to the noisy digital signal for reducing quantization noise.

4. The system as claimed in claim 2, wherein the pre-processing unit comprises a subtractor configured to deduct background noise from the noisy digital signal.

5. The system as claimed in claim 1, wherein the signal unit comprises a receiver to receive the digital signal.

6. The system as claimed in claim 1 further comprising a digital signal processor to amplify the output signal.

7. The system as claimed in claim 1, wherein the signal synthesizer is further configured to transform the noiseless signal into the output signal with substantially high precision twiddle factors.

8. The system as claimed in claim 1, wherein the threshold filter is further configured to purge one or more noise bins based on the threshold profile.

9. The system as claimed in claim 8, wherein the threshold profile is a dynamic amplitude threshold value based on background noise.

10. The system as claimed in claim 9, wherein the background noise is detected by one or more error microphones.

11. The system as claimed in claim 8, wherein the gain is proportional to the total energy lost in purging the one or more noise bins.

12. A noise removal system comprising:
    a transformation module configured to transform a digital signal into an f-digital signal in frequency domain;
    a threshold filter configured to remove noise, based on a threshold profile, from the f-digital signal to generate a noiseless signal, wherein removing the noise leaves a dynamic headroom;
    a signal synthesizer configured to provide a gain to the noiseless signal for at least recovering the dynamic headroom; and
    a residue noise module having an input coupled to the transformation module and an output coupled to the threshold filter to dynamically determine the threshold profile.

13. The noise removal system as claimed in claim 12, wherein the signal synthesizer is configured to transform the noiseless signal in frequency domain into an output signal in time domain.

14. The noise removal system as claimed in claim 13, wherein the signal synthesizer is configured to transform the noiseless signal into an output signal using substantially high precision twiddle factors.

15. The noise removal system as claimed in claim 12, wherein the threshold filter is further configured to remove the noise by purging at least one noise bin below the threshold profile.

16. The noise removal system as claimed in claim 12, wherein the threshold profile is a dynamic amplitude threshold value based on background noise.

17. The noise removal system as claimed in claim 12 further comprises a signal optimizer configured to optimize the f-digital signal.

18. The noise removal system as claimed in claim 12, wherein the gain is proportional to the noise removed by the threshold filter.

19. A method comprising:
   transforming a digital signal to an f-digital signal in a transformation module;
   generating a noiseless signal, based on a threshold profile, from the f-digital signal in a threshold filter;
   providing a gain to the noiseless signal to recover a dynamic headroom in a signal synthesizer, wherein the dynamic headroom is created due to generation of the noiseless signal; and
   dynamically determining the threshold profile in a residue noise module having an input coupled to the transformation module and an output coupled to the threshold filter.

20. The method as claimed in claim 19, wherein the generating a noiseless signal further comprises purging noise bins corresponding to at least one of background noise and quantization noise.

21. The method as claimed in claim 19 further comprising:
   receiving an audio input signal from an external source;
   converting the audio input signal into a noisy digital signal; and
   pre-processing the noisy digital signal.

22. The method as claimed in claim 21, wherein the pre-processing comprises adding a dither signal to the noisy digital signal to minimize quantization noise.

23. The method as claimed in claim 21, wherein the pre-processing comprises deducting background noise from the noisy digital signal.

24. The method as claimed in claim 23, wherein the pre-processing further comprises determining the background noise using at least one error microphone.

25. The method as claimed in claim 19 further comprises synthesizing an output signal from the noiseless signal using substantially high precision twiddle factors.

* * * * *